United States Patent
Rosenwinkel

(10) Patent No.: US 9,478,034 B1
(45) Date of Patent: Oct. 25, 2016

(54) GEOPOSITION DETERMINATION BY STARLIGHT REFRACTION MEASUREMENT

(71) Applicant: Lockheed Martin Corporation, Bethesda, MD (US)

(72) Inventor: Alan M. Rosenwinkel, Haddonfield, NJ (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 0 days.

(21) Appl. No.: 14/321,375

(22) Filed: Jul. 1, 2014

Related U.S. Application Data

(62) Division of application No. 12/732,809, filed on Mar. 26, 2010, now Pat. No. 8,767,072.

(51) Int. Cl.
| | |
|---|---|
| H04N 7/18 | (2006.01) |
| G06T 7/00 | (2006.01) |
| G06K 9/00 | (2006.01) |
| G06K 9/62 | (2006.01) |

(52) U.S. Cl.
CPC .......... *G06T 7/0044* (2013.01); *G06K 9/0063* (2013.01); *G06K 9/6202* (2013.01); *G06T 2207/30212* (2013.01)

(58) Field of Classification Search
USPC ........................................... 348/148
See application file for complete search history.

(56) References Cited

U.S. PATENT DOCUMENTS

| | | | | |
|---|---|---|---|---|
| 3,165,632 A | * | 1/1965 | Hansen | 250/203.6 |
| 3,781,114 A | | 12/1973 | Marsh et al. | |
| 3,827,807 A | * | 8/1974 | Fletcher et al. | 356/139.02 |
| 4,280,140 A | * | 7/1981 | Skerlos | 348/735 |
| 4,621,329 A | * | 11/1986 | Jacob | 701/513 |
| 4,746,976 A | * | 5/1988 | Kamel et al. | 348/116 |
| 4,944,587 A | * | 7/1990 | Harigae | 356/139.01 |
| 5,062,051 A | * | 10/1991 | Sainct et al. | 701/514 |
| 5,109,346 A | | 4/1992 | Wertz | |
| 5,128,756 A | * | 7/1992 | Johnston et al. | 375/240.12 |

(Continued)

OTHER PUBLICATIONS

Gubler, J. et al., "Differential Atmospheric Refraction and Limitations on the Relative Astronomic Accuracy of Large Telescopes", Publications of the Astronomical Society of the Pacific, 110:738-746, Jun. 1998.

(Continued)

*Primary Examiner* — Leron Beck
(74) *Attorney, Agent, or Firm* — Howard IP Law Group, P.C.

(57) ABSTRACT

A system and method are disclosed for determining geoposition of an observer. The system includes a sensor such as a wide field of view camera or telescope that can capture an image of the sky. The image of the sky is used to compile a table or list of the stars in the sky along with their positions. This table or list is pattern-matched with a predetermined list or table of stars to identify each star. In one embodiment, the distances between all stars in the image are computed and compared to star images from an atmospheric refraction model. A comparison of the measured table or list and the refraction model, using an optimization algorithm, is performed to determine the geoposition of the observer. In an alternative embodiment, a sensor capable of measuring two different frequency bands obtains two images of each star in the sky simultaneously. A difference in displacement is determined between the two frequencies for each imaged star; and a magnitude and direction of the difference in displacement is used to determine the geoposition of a body.

12 Claims, 4 Drawing Sheets

(56) References Cited

U.S. PATENT DOCUMENTS

| | | | | |
|---|---|---|---|---|
| 5,155,490 | A * | 10/1992 | Spradley et al. | 342/357.44 |
| 5,206,499 | A | 4/1993 | Mantravadi et al. | |
| 5,412,574 | A | 5/1995 | Bender et al. | |
| 5,497,769 | A * | 3/1996 | Gratton et al. | 600/323 |
| 5,508,932 | A * | 4/1996 | Achkar | B64G 1/24 244/164 |
| 5,696,578 | A * | 12/1997 | Ishida et al. | 356/28.5 |
| 5,748,651 | A * | 5/1998 | Sheynblat | 714/800 |
| 5,809,457 | A | 9/1998 | Yee et al. | |
| 5,865,402 | A * | 2/1999 | Fischer et al. | 244/166 |
| 6,012,000 | A | 1/2000 | Holmes et al. | |
| 6,061,611 | A | 5/2000 | Whitmore | |
| 6,102,338 | A * | 8/2000 | Yoshikawa et al. | 244/171 |
| 6,108,594 | A * | 8/2000 | Didinsky et al. | 701/13 |
| 6,111,780 | A | 8/2000 | Bertin | |
| 6,158,694 | A | 12/2000 | Gowrinathan | |
| 6,205,400 | B1 | 3/2001 | Lin | |
| 6,246,960 | B1 | 6/2001 | Lin | |
| 6,266,616 | B1 | 7/2001 | Needelman | |
| 6,272,432 | B1 * | 8/2001 | Li et al. | 701/501 |
| 6,362,464 | B1 * | 3/2002 | Liu et al. | 250/206.1 |
| 6,408,245 | B1 | 6/2002 | An et al. | |
| 6,523,786 | B2 | 2/2003 | Yoshikawa et al. | |
| 6,577,929 | B2 * | 6/2003 | Johnson et al. | 701/4 |
| 6,757,445 | B1 | 6/2004 | Knopp | |
| 6,950,139 | B2 * | 9/2005 | Fujinawa | 348/335 |
| 7,197,829 | B2 * | 4/2007 | Acres | 33/268 |
| 7,428,780 | B2 * | 9/2008 | Lemp et al. | 33/268 |
| 7,447,591 | B2 | 11/2008 | Belenkii et al. | |
| 7,451,022 | B1 | 11/2008 | Luk-Paszyc et al. | |
| 7,471,211 | B2 * | 12/2008 | Lemp, III | 340/815.4 |
| 7,477,367 | B2 * | 1/2009 | Subbiondo et al. | 356/139.01 |
| 7,617,070 | B2 * | 11/2009 | Kurth et al. | 702/150 |
| 7,634,776 | B2 * | 12/2009 | Parameswaran et al. | 718/105 |
| 7,676,305 | B2 * | 3/2010 | Potteck | 701/13 |
| 7,982,951 | B1 | 7/2011 | Innes et al. | |
| 8,121,356 | B2 * | 2/2012 | Friedman et al. | 382/115 |
| 8,140,034 | B2 * | 3/2012 | DeCusatis et al. | 455/126 |
| 8,222,582 | B1 * | 7/2012 | Anderson | 244/3.18 |
| 8,676,490 | B1 | 3/2014 | Rosenwinkel et al. | |
| 8,837,782 | B1 | 9/2014 | Rosenwinkel et al. | |
| 2003/0044077 | A1 | 3/2003 | Okada | |
| 2004/0140962 | A1 * | 7/2004 | Wang et al. | 345/179 |
| 2005/0071055 | A1 * | 3/2005 | Needelman et al. | 701/13 |
| 2006/0140494 | A1 | 6/2006 | Ishikawa | |
| 2006/0232585 | A1 * | 10/2006 | Montagnese et al. | 345/428 |
| 2007/0010965 | A1 | 1/2007 | Malchi et al. | |
| 2007/0014347 | A1 * | 1/2007 | Prechtl et al. | 375/240.01 |
| 2007/0038374 | A1 * | 2/2007 | Belenkii et al. | 701/222 |
| 2007/0282190 | A1 * | 12/2007 | Dekel et al. | 600/407 |
| 2008/0130742 | A1 * | 6/2008 | Scheuermann | 375/240.02 |
| 2008/0199077 | A1 * | 8/2008 | Fowell | 382/190 |
| 2008/0297586 | A1 * | 12/2008 | Kurtz et al. | 348/14.08 |
| 2009/0177398 | A1 | 7/2009 | Belenkii et al. | |
| 2010/0014597 | A1 * | 1/2010 | Gao | 375/240.29 |
| 2010/0020073 | A1 * | 1/2010 | Corazza et al. | 345/420 |
| 2010/0160778 | A1 * | 6/2010 | Eskandari et al. | 600/438 |
| 2010/0315290 | A1 * | 12/2010 | Grabbe | 342/386 |
| 2011/0149060 | A1 * | 6/2011 | Jiang et al. | 348/77 |

OTHER PUBLICATIONS

Murtagh, F., "A New Approach to Point-Pattern Matching", Publications of the Astronomical Society of the Pacific, 104:301-307, Apr. 1992.

Ruiz, A., "Navigational Algorithms—Celestial Fix 2 LoP analytic solution", http://www.geocities.com/andresruizgonzalez.

Thomas, M. E., et al., "Astronomical Refraction", Johns Hopkins Apl Technical Digest, vol. 17, No. 3 (1996), pp. 279-284.

Liping, Z., et al., "Autonomous Orbit Determination for Earth Satellites by Starlight Atmospheric Refraction", College of Astronautics, Northwestern Polytechnical University, Xi'an, China.

Vittitoe, C.N., et al., "Analytic Fit of Deviation Caused by Atmoshpheric Refraction of Starlight as a Function of Space-Based Sensor Position", for Poster Session at the 1997 Infrared Information Symposia Specialty Group on Targets, Backgrounds, and Discrimination Space Surveillance, Johns Hopkins University Applied Physics Laboratory, Laurel, MD, Jun. 4-5, 1997.

"Stellar Aberration", http://www.mathpages.com/rr/s2-05/2-05.html, Sep. 8, 2009, pp. 1-13.

"The Celestial Sphere:How do astronomers keep track of the sky when the earth is constantly moving?", http://www.astro.cornell.edu/academics/courses/astro201/cel_sphere.htm, pp. 1-2.

"The Celestial Sphere", http://csep10.phys.utk.edu/astr161/lect/celestial/celestial.html, pp. 1-3.

Mangum, J., "Atmospheric Refractive Signal Bending and Propagation Delay", pp. 1-27.

"Astronomical Information Sheet No. 66", prepared by HM Nautical Almanac Office, The United Kingdom Hydrographic Office, Crown Copyright 2007.

* cited by examiner

GEOPOSITION DETERMINATION BY STARLIGHT REFRACTION MEASUREMENT

CROSS-REFERENCE TO RELATED APPLICATION

This application is a divisional of co-pending U.S. patent application Ser. No. 12/732,809 filed Mar. 26, 2010, titled GEOPOSITION DETERMINATION BY STARLIGHT REFRACTION, the entire contents of all of which are hereby incorporated by reference herein in their entirety.

GOVERNMENT RIGHTS

This invention was made with Government Support under Contract No. N00024-03-C-6110 awarded by the Department of the Navy. The Government has certain rights in this invention.

FIELD OF THE DISCLOSURE

The invention relates to geopositioning systems in general, and more particularly to a system for determining geoposition of a body using one or more starlight images in combination with atmospheric refraction models.

BACKGROUND OF THE DISCLOSURE

Position of a moving platform such as a ship at sea or a moving land vehicle is generally determined using a Global Positioning System (GPS). Without GPS, dead reckoning is often used in which measurements of angular rotation rates and translational accelerations (using gyroscopes and accelerometers) are integrated to calculate position. This method of position determination is unavoidably subject to drift errors which grow with time, making it useful for accurately determining position only over relatively short periods of time.

Historically, position determination using celestial observations has been achieved using the sight reduction method which uses measurements of star altitudes off the horizon to compute lines of position, the intersection of which defines the estimate of ship position. This method requires either visual measurement of the horizon or inertial measurement of the local gravity vector as a benchmark for all star observations and is therefore highly inaccurate on a moving platform.

Position of a moving platform may also be calculated by triangulating an observer's position from three or more satellite position measurements. This method, however, is sensitive to knowledge of the absolute knowledge of the position of the satellites.

It would be desirable to have a geoposition determination scheme that is not susceptible to the accuracy issues that plague prior techniques.

SUMMARY OF THE DISCLOSURE

The purpose of the invention is to determine geoposition of a moving platform without the use of the global positioning system (GPS). This capability is most relevant to military applications, where the threat of GPS outage (jamming) is of great importance but is also applicable to commercial position determination.

A method is disclosed for determining geoposition. The method may comprise obtaining an image or multiple images of the sky; compiling a list or table of a plurality of stars and their positions in the sky from said image or images; pattern-matching the list or table of said plurality of stars with a predetermined list or table of stars to identify each of the plurality of stars; computing respective distances between pairs of said plurality of stars; comparing the respective distances between said pairs of said plurality of stars to an atmospheric refraction model; and determining the geoposition of a body based on said comparing step. In one embodiment, the step of obtaining an image or images of the sky comprises obtaining a single image of the sky using a wide-field-of-view camera. In another embodiment, the step of obtaining an image or images of the sky comprises obtaining multiple images of single stars using a pointed telescope.

A method is disclosed for determining geoposition. The method may comprise obtaining an image or multiple images of the sky; compiling a list or table of a plurality of stars and their positions in the sky from said image; pattern-matching the list or table of said plurality of stars with a predetermined list or table of stars to identify each of said plurality of stars; obtaining first and second light frequencies emitted from each of said plurality of stars in the sky; determining a difference in displacement between the two frequencies for each of said plurality of stars; and correlating a magnitude and direction of said difference in displacement to determine the geoposition of a body.

A system is disclosed for determining geoposition. The system comprises a camera for receiving light emitted from each of a plurality of stars in the sky, a sensor connected to the camera, the sensor configured to detect in two different frequency bands, and a processor in communication with the sensor. The processor is configured to execute instructions for performing the following steps: determining a difference in displacement between detected first and second light frequencies for each of said plurality of stars; and determining the geoposition of a body associated with the camera based on a location in the sky from which the light is not refracted.

BRIEF DESCRIPTION OF THE DRAWINGS

The details of the invention, both as to its structure and operation, may be obtained by a review of the accompanying drawings, in which like reference numerals refer to like parts, and in which.

DETAILED DESCRIPTION

Figure 1:
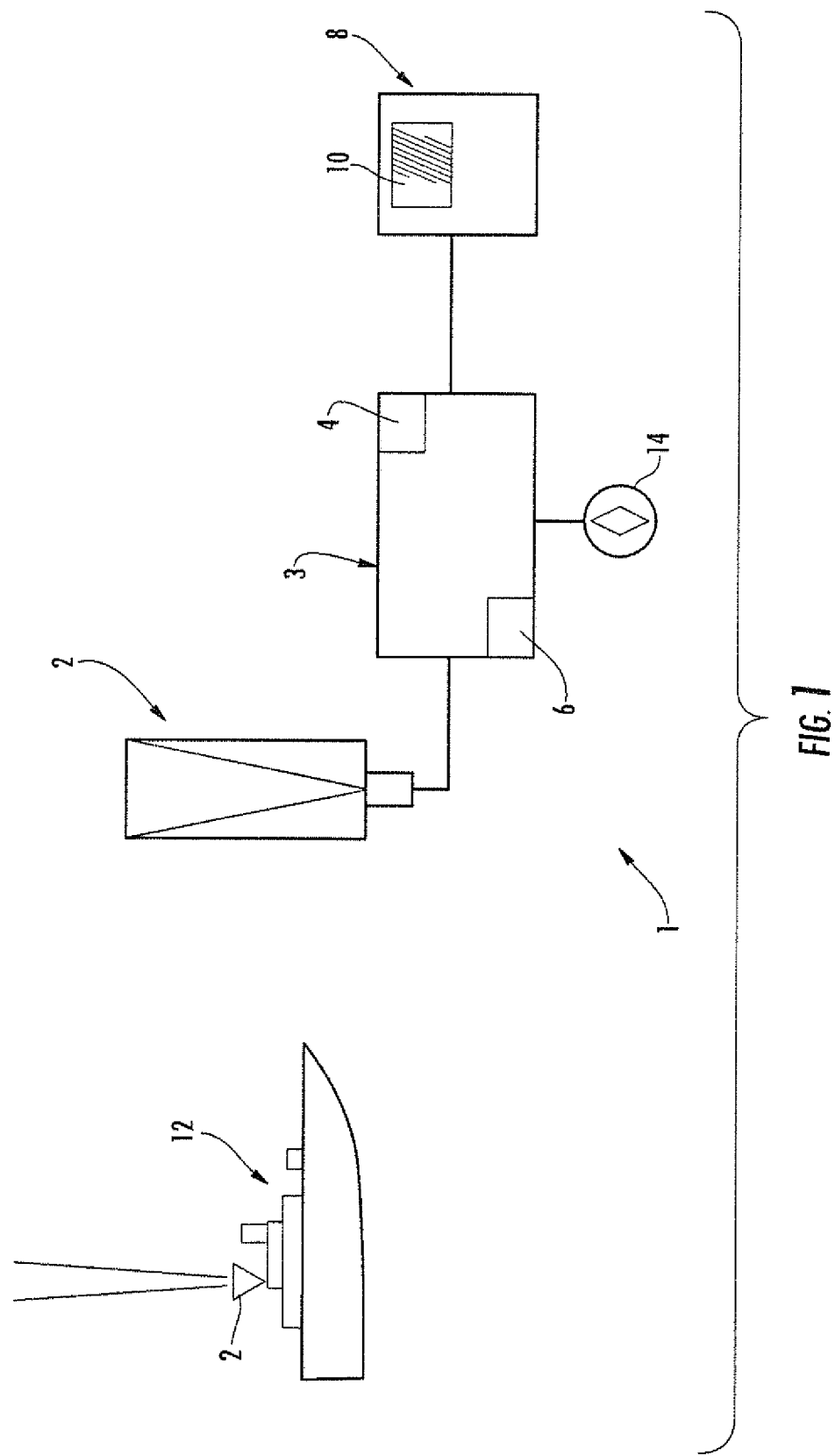
FIG. 1 is a schematic showing an exemplary system for determining geoposition by star light.

Geoposition of an observer (e.g. a ship or land vehicle) is essentially the vector to the center of the earth in the Earth-Centered-Earth-Fixed (ECEF) frame, which can be related to latitude and longitude by trigonometric calculations. In the disclosed system and method, this ECEF position vector is determined by measuring the position of star images, which are displaced by atmospheric refraction as a function of geoposition, using an Electro-Optical Sensor (EOS) which converts the light rays into electronic signals. These measured positions are compared to predicted positions based on well-known highly accurate (e.g., sub-arc-second) atmospheric refraction models, given local temperature and pressure and other parameters. See, e.g. Gubler and Tytler, "Differential Atmospheric Refraction and Limitations on the Relative Astrometric Accuracy of Large Telescopes," Publications of the Astronomical Society of the Pacific, 110:738-746, 1998, the entirety of which is incorporated by reference. This model consists of predictions of the path of light traveling through the earth's atmosphere based on various simplifying assumptions about the atmosphere itself which make the problem tractable. The model takes as inputs measurements of local temperature and pressure as well as assumed values for temperature lapse rate, height of tropopause, and the height of the stratosphere. Since atmospheric refraction models are based on temperature and pressure, the system also includes temperature and pressure sensors to account for such dependency. These sensors may be mounted in any location that enables measurement of ambient temperature and pressure, and which minimizes influence of the immediate surroundings (i.e., not heated or cooled by nearby computer hardware, air vents, or the like).

The disclosed system and method may be used to determine the location on the celestial sphere where star light directed at the observer's location is not refracted. Since there is only one location on the surface of the earth from which zero refraction of light is observed from a given point on the celestial sphere, identifying such a refraction-free point on the celestial sphere uniquely determines the observer's geoposition. Identification of this point of zero refraction can be achieved in two distinct ways, or as a combination of both.

The disclosed system and method have a number of advantages in that they are more accurate than prior systems and methods that are based on inertial navigators that integrate angular rates and accelerations, because the position estimate does not degrade with time. The disclosed system and method is more accurate than existing methods for calculating position on a moving platform from celestial observations because it does not rely on an inertial navigation system to measure the local gravity vector, nor does it require measurement of the horizon, both of which are inherently inaccurate.

The disclosed system and method can be used during the day as well as at night. The disclosed system and method can be implemented using only a camera and information regarding local atmospheric conditions (obtained, for example, using the aforementioned temperature and pressure sensor) and does not require additional equipment such as an inertial navigation system, radar, etc. For embodiments in which the platform is subject to relatively constant movement (e.g., where it is mounted onboard a ship), the accuracy of the disclosed system and method may be further improved by incorporating a gyroscope to track, and correct for, platform movement between readings.

Referring now to FIG. 1, an exemplary system 1 for position determination comprises an image acquisition device 2, a system controller 3 for processing image data from the image acquisition device, and a memory 4 for storing the processed image data. The system controller 3 may comprise a processor 6 and may be connected to an output device 8. In one embodiment, the output device includes a graphical display 10 capable of providing the geoposition information directly to a user in the form of coordinates or a graphical display on a map. In another embodiment, the output device 8 is a connected computing device that receives the geoposition information and uses the information for improved navigation solution of ship or land-based platforms. The system 1 may be mounted on a platform 12, which in the illustrated embodiment is a ship. The system controller 3 may be connected to, and receive input from, a gyroscope 14 to enable platform 12 movements to be measured and corrected for.

The system 1 of FIG. 1 may be used to obtain a single image of the stars in the sky. In one embodiment, the image acquisition device 2 comprises a wide field of view (FOV) camera capable of obtaining a single image of the sky, or of a substantial portion of the sky, in a single shot. The amount of sky included in the image depends on the desired accuracy. In one embodiment, an image comprising at minimum 3 stars which are as close to 120 degrees apart as possible may be used.

Alternatively, the image acquisition device 2 may comprise a pointed telescope or small field of view camera, and multiple images of single stars may be obtained from which star positions can be tabulated. The said table is then assembled using measured pointing information from the camera mount as well as measured rotation from the gyroscope 14 to provide the coordinates of each star in a reference coordinate system. For this multiple-image embodiment, a system is provided for pointing the camera at specific locations in the sky to obtain desired incremental images. Such a system may include an inertially-stabilized mount, which includes a platform to which the camera is attached, and which can be oriented in azimuth and elevation, along with encoders which measure the precise azimuth and elevation of the mount relative to its base. One non-limiting example of such a mount is the MK20 Electro-Optical Sensor System from Kollmorgen. The gyroscope 14, or an inertial navigation system (with a gyroscope as a component, such as the LN-100 INS from Litton), is mounted to the base to measure the orientation of the mount relative to a fixed reference frame.

For embodiments in which the table of star positions are tabulated from multiple smaller images are, it can be important to compensate for movements in the platform 12 between snapshots. Such movements can occur where the platform 12 is positioned on a body of water such that it is subject to movement between the acquisition of multiple images (e.g., where the platform 12 is a ship). Thus, the gyroscope 14 can be used to track, and correct for, those movements such that the resulting image of the sky is accurate.

In either case, a table of star positions of all the visible stars in the sky is compiled and is pattern-matched to identify each star within that table. A table of known star locations of all visible stars in the sky will be stored in the system's database to enable repeated pattern matching. The distances, in pixels, between all stars in the table are tabulated and converted to radians for comparison to a star catalog, which is a table of known stars along with their locations and brightnesses, which can be used to look up the expected position of a star in the sky for a given location on the earth's surface, and at a given moment in time. The accuracy of these distance measurements can be extremely high, particularly if a fixed-lens camera is used having sub-arc-second accuracy. It will be appreciated that it is not critical that the camera have sub-arcsecond accuracy, but a high accuracy camera will result in overall enhanced system accuracy.

Because the distances between the stars in the image will vary as a function of the observer's position (due to the dependence of the refraction on geoposition), these distances can be predicted as a function of geoposition with high accuracy (~5 micro radians) from known atmospheric refraction models, such as those described in Gubler and Tytler. As the stars get closer to the horizon, the degree of refraction of the light coming from those stars changes. By comparing the positions of the tabulated stars, which are derived from the star images, with the expected refraction (their known/expected positions), it is possible to find the location where the expected image looks like the image you're actually taking. An optimization algorithm can be used to accurately determine the geoposition for which the predicted star refraction pattern best-fits the measurements. In one exemplary embodiment, an optimization algorithm (e.g. the Levenberg-Marquardt algorithm, or a steepest descent optimization algorithm) can be used to accurately determine the geoposition for which the predicted star refraction pattern best-fits the measurements.

SECOND EMBODIMENT

As in the first embodiment, the second embodiment uses either a single image of the sky taken with a sensor 16 such as a wide-field-of-view camera, or uses multiple images of single stars taken with a sensor such as a pointed telescope. Again, a gyroscope 14 can be used to track, and correct for, rotation of the platform between star sightings. In either case, a single table of all stars in the image or images is compiled and pattern-matched to identify each star in the image or images.

Figure 2:
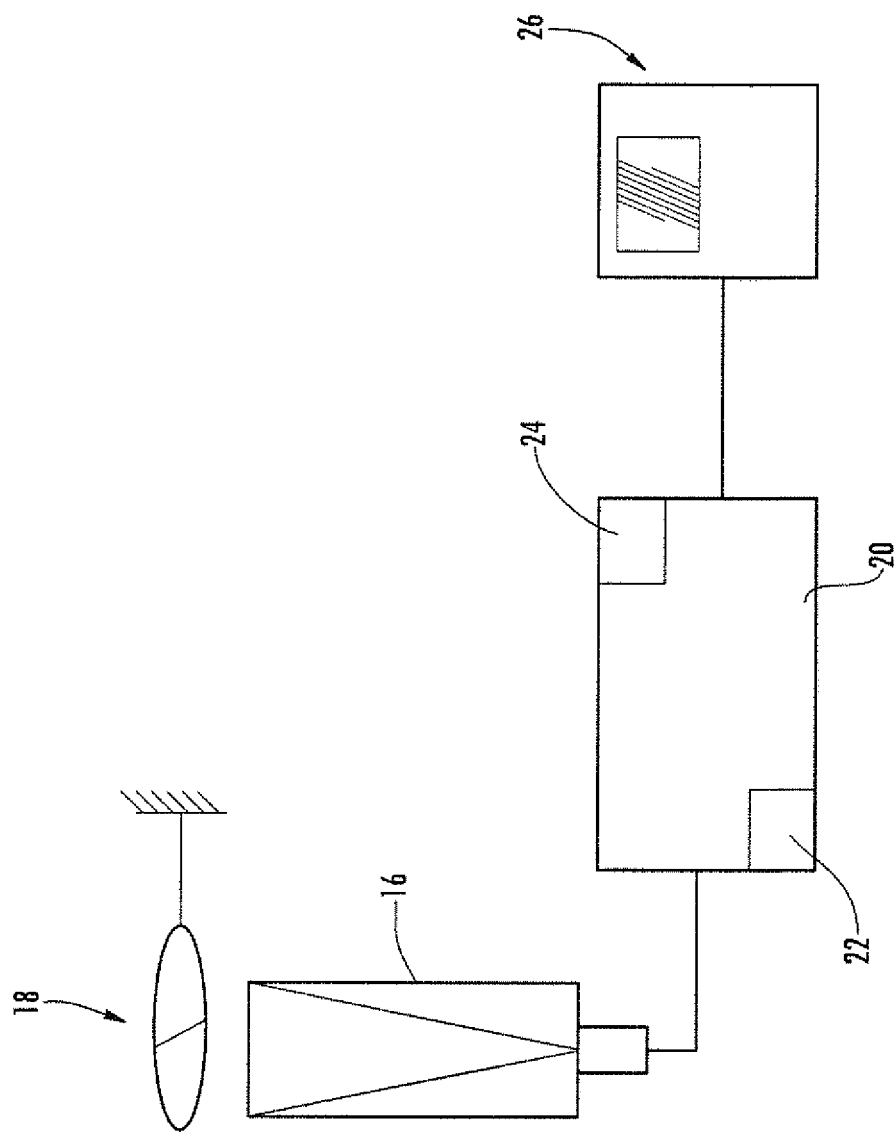
FIG. 2 is a schematic showing a second exemplary system for determining geoposition by star light.

In the second embodiment, two images of each star (or the entire sky) are then taken simultaneously, or nearly simultaneously, using a sensor 16 or sensors which can detect two different frequency bands. In one embodiment, the first frequency band is the visible frequency band, and the second frequency band is the infrared frequency band. Because the atmosphere refracts each frequency of light by a different amount, the displacement between the two frequencies can be measured for each star in the measured image. As shown in FIG. 2, the sensor 16 can be a single camera or telescope having a movable filter 18 that can be adjusted between first and second positions. In the first position, the filter enables only visible light to reach the sensor 16, while in the second position, the filter enables only infrared light to reach the sensor. Using visible light and infrared light may be advantageous due to low atmospheric absorption at those frequencies. It will be appreciated, however, that the two different frequencies needn't be visible and infrared, but instead can be any two frequencies of light. It will also be appreciated that the farther apart the two frequencies, the better the accuracy of the system. The system of FIG. 2 may also include a system controller 20, processor 22, memory 24, and output device 26 similar to that of the system of FIG. 1.

Depending upon the observer's position with respect to a particular star, there will be an offset between the visible light and the infrared light received from that star. If the observer is looking at a star directly overhead (i.e., perpendicular to the Earth's surface), there should be little or no displacement between the two frequencies (ideally). If, on the other hand, the observer is looking at a star on the horizon, the displacement between the two frequencies should be relatively large. By looking at a number of different stars, it is possible to determine the location on the Earth's surface (i.e., the geoposition) that results in the observed pattern.

Because the magnitude (and direction) of the displacement between the measured frequency bands depends on the observer's geoposition, and is known to high accuracy (~5 micro radians), in a manner similar to the first embodiment, and optimization algorithm can be used to determine the geoposition for which the predicted star refraction pattern best-fits the measurements. In one exemplary embodiment, a know optimization algorithm (e.g. the Levenberg-Marquardt algorithm, or a steepest descent optimization algorithm) can be used to accurately determine the geoposition for which the predicted star refraction pattern best-fits the measurements.

In one embodiment of a single frequency technique, a wide-FOV camera can be used to obtain an image of the sky. A list of stars in the image, their locations in the image (x and y pixels) and their measured brightness's are tabulated. A known point pattern matching algorithm (see, e.g., Murtagh, "A New Approach to Point-Pattern Matching, 1992) is used to identify individual stars in image. For any location on the earth's surface at any given time the expected locations and brightnesses of those stars are predicted based on their known locations from star tables and refraction models (e.g. Gubler and Tytler, 1998). A similarity metric (e.g., root mean squared error) is used to quantify the similarity between the actual measured star locations and the predicted locations. A known minimization algorithm (e.g. the Levenberg-Marquardt algorithm, or a steepest descent optimization algorithm) is then used to determine position for earth for which the similarity metric defined in step 5 is minimized.

In another embodiment of a single frequency technique, a narrow-FOV pointed camera is used to obtain an image of a portion of the sky. A list of stars in the image is tabulated, along with their locations in the image (x and y pixels), and their measured brightnesses. If an estimate of position and attitude (orientation) is known, the portion of sky may be chosen by pointing the camera to a location where a star is predicted to be from a star table. Simultaneously to the tabulation step, camera orientation relative to a time-fixed coordinate system is recorded, e.g. by measuring the mount pointing orientation using internal encoders and measuring platform rotations using an inertial navigation system or gyroscopes. The tabulated star data along with camera orientation relative to a time-fixed frame is then used to calculate star locations relative to the time-fixed frame. These steps are repeated until a sufficient number of stars are imaged to obtain a pattern recognition and identify stars. For any location on the earth's surface at any given time the expected locations and brightnesses of those stars are predicted based on their known locations from star tables and refraction models (e.g., Gubler and Tytler, 1998). A similarity metric (e.g., root mean squared error) is used to quantify the similarity between the actual measured star locations and the predicted locations. A minimization algorithm (e.g., the Levenberg-Marquardt algorithm, or a steepest descent optimization algorithm) is then used to determine position on earth for which the similarity metric defined in step 5 is minimized.

In a further embodiment, using a multiple frequency technique, a wide FOV camera is used to obtain an image of the sky. A list of stars in the image, their locations in the image (x and y pixels) in each of two frequencies, and their measured brightness's are tabulated. A known point pattern matching algorithm is used to identify individual stars in image (see, e.g., Murtagh, 1992). For any location on the earth's surface at any given time the expected difference in location of that star in a first frequency and a second frequency is predicted based on their known locations from star tables and refraction models (e.g., Gubler and Tytler, 1998). A similarity metric (e.g., root mean squared error) is used to quantify the similarity between the actual measured difference in star locations between the two frequencies and the predicted differences. A minimization algorithm (e.g., the Levenberg-Marquardt algorithm, or a steepest descent optimization algorithm) is then used to determine position on earth for which the similarity metric in the previous step is minimized.

In another embodiment of a multiple frequency technique, a narrow-FOV pointed camera is used to image a portion of the sky and to tabulate a list of stars in the image, their locations in the image (x and y pixels) in two different frequencies, and their measured brightnesses. If an estimate of position and attitude (orientation) is known, the portion of sky may be chosen by pointing the camera to a location where a star is predicted to be from the star table. Simultaneously, camera orientation relative to a time-fixed coordinate system is recorded, e.g. by measuring the mount pointing orientation using internal encoders and measuring platform rotations using an inertial navigation system or gyroscopes. The tabulated star data and camera orientation relative to a time-fixed frame are then used to calculate star locations relative to the time-fixed frame. These steps are repeated until a sufficient number of stars are imaged to perform pattern recognition and identify stars. For any location on the earth's surface at any given time the expected difference in location of that star in a first frequency and a second frequency is predicted based on their known locations from star tables and refraction models (e.g., Gubler and Tytler, 1998). A similarity metric (e.g., root mean squared error) is used to quantify the similarity between the actual measured difference in star locations between the two frequencies and the predicted differences. A minimization algorithm (e.g., the Levenberg-Marquardt algorithm, or a steepest descent optimization algorithm) is then used to determine position on earth for which the similarity metric in the previous step is minimized.

Figure 3:
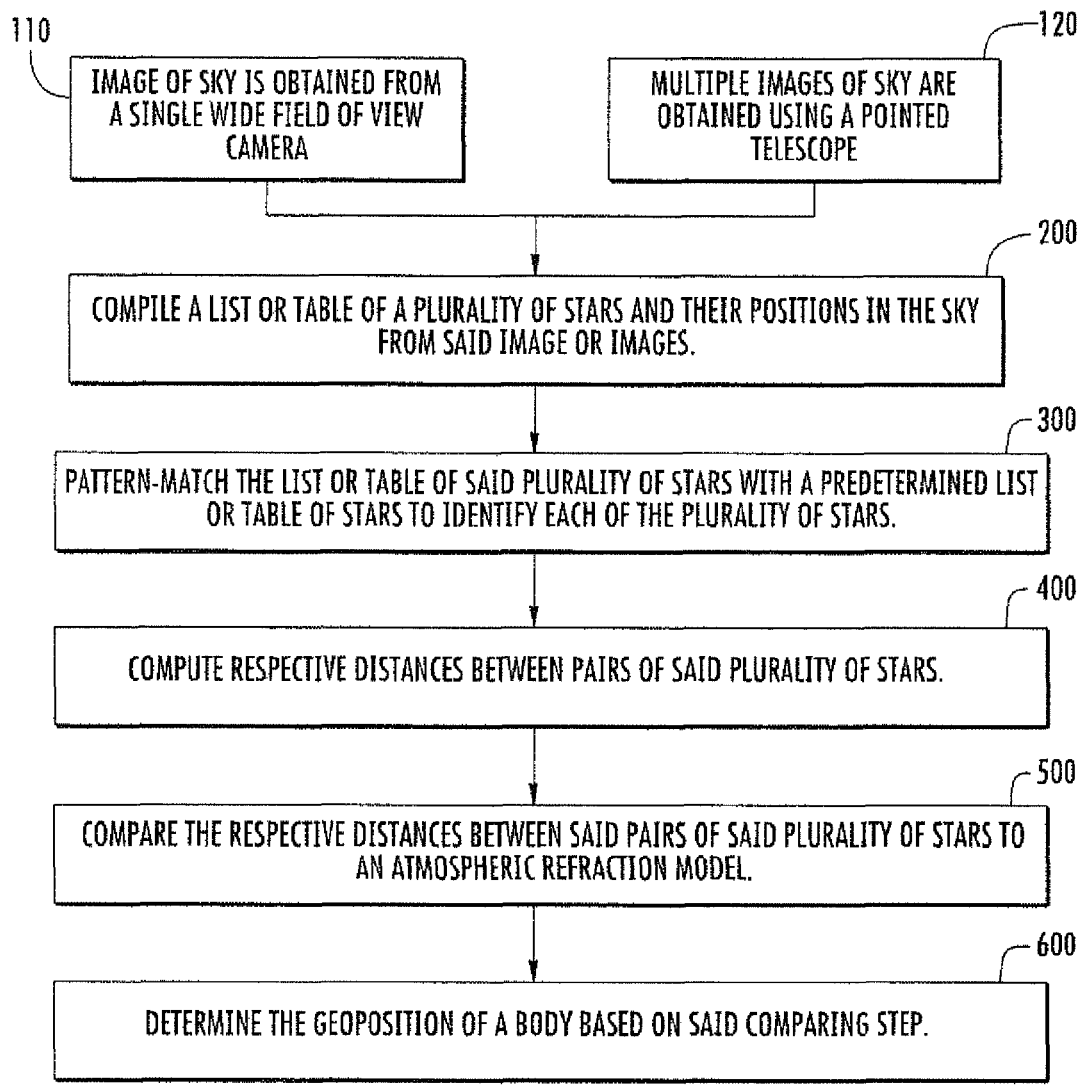
FIG. 3 is a flow chart illustrating a first exemplary method for using the system of FIG. 1 to determine geoposition.

Referring now to FIG. 3, a generalized method for determining geoposition using the system of FIG. 1 will be described in greater detail. In one embodiment (step 110) a wide field of view sensor 2 is used to obtain a single image or the sky. In an alternate embodiment (step 120) a pointed telescope 2 is used to take multiple smaller images of the sky. Additionally, a gyroscope may be used to track movement of the sensor occurring at different points in time. At step 200, a list or table of a plurality of stars in the sky is compiled from the image of the sky. At step 300, the list or table of the plurality of stars is pattern-matched with a predetermined list or table of stars to identify each of the plurality of stars. At step 400, respective, distances between pairs of the plurality of stars are computed. At step 500, the respective distances between the pairs of stars are compared to an atmospheric refraction model. At step 600, the comparison of step 500 is used to determine the geoposition of a body. In one embodiment, the optimization algorithm determines a predicted star refraction pattern that best fits the computed distances between pairs of imaged stars.

Figure 4:
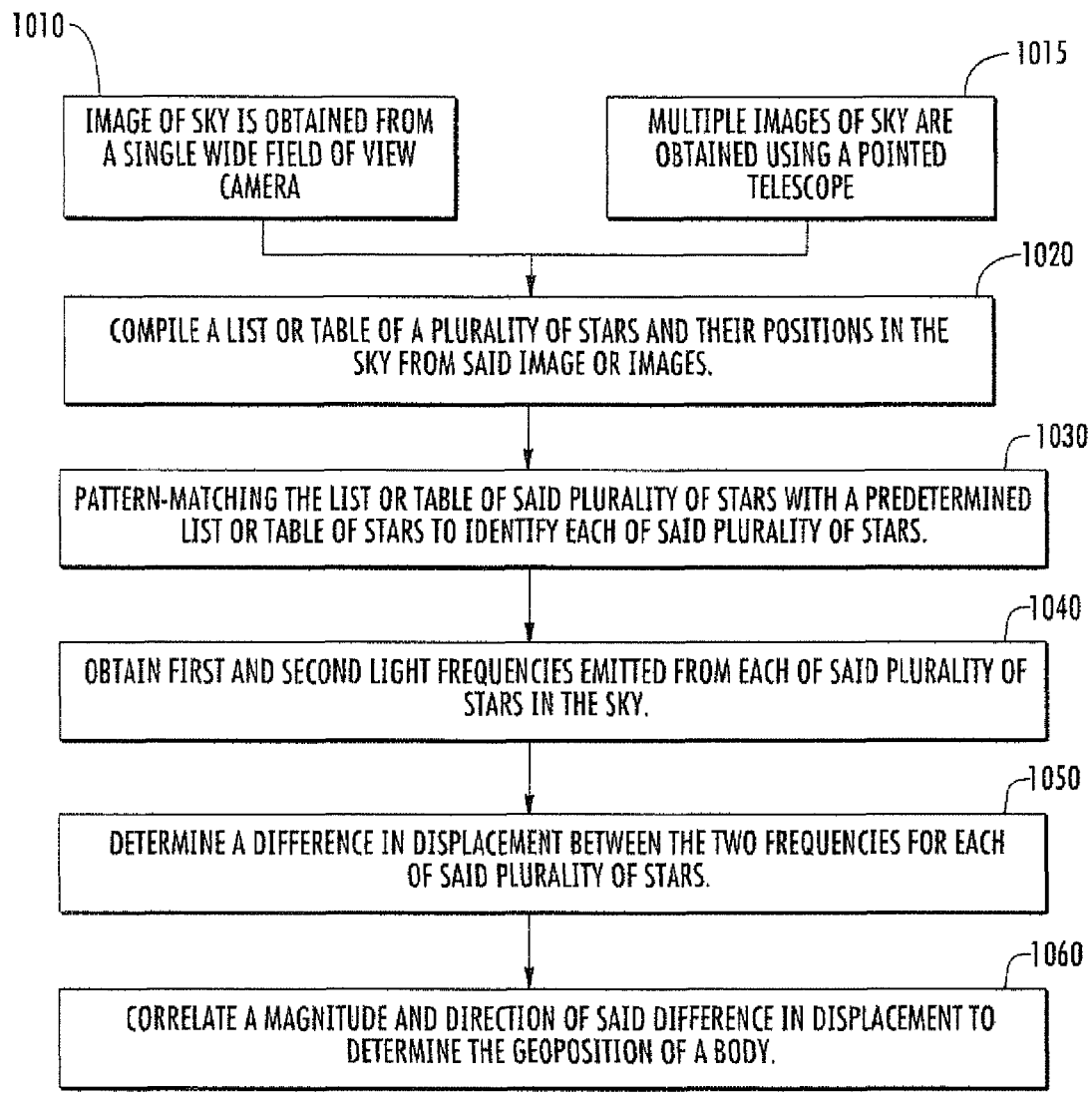
FIG. 4 is a flow chart illustrating a second exemplary method for using the system of FIG. 2 to determine geoposition.

Referring to FIG. 4, a generalized method for determining geoposition using the system of FIG. 2 will be described in greater detail. In one embodiment (step 1010), a single image of the sky is obtained using a wide field of view camera. In an alternative embodiment (step 1015), multiple images of single stars using a pointed telescope are obtained. At step 1020, a list or table of the plurality of stars and their positions in the sky is compiled from the image or images of the sky. At step 1030, the list or table of the plurality of stars is pattern-matched with a predetermined list or table of stars to identify each of the plurality of stars. At step 1040, first and second light frequencies emitted from each of a plurality of stars are obtained. At step 1050, a difference in displacement between the first and second light frequencies is determined for each of the plurality of stars. At step 1060, a magnitude and direction of the difference in displacement is correlated to determine the geoposition of a body.

In one embodiment, the step of obtaining first and second light frequencies comprises using a sensor that detects in two different frequency bands. In another embodiment, the first and second light frequencies are detected using a sensor such as a telescope having a filter with two filtering modes, where the first filtering mode allows only visible light to enter the telescope, and the second filtering mode allows only infrared light to enter the telescope. The first and second light frequencies may comprise visible light and infrared light, respectively.

The step of obtaining first and second light frequencies may further comprise obtaining multiple light readings from individual stars of the plurality of stars at first and second times, and using a gyroscope to track movement of the telescope occurring between said first and second times. The step of determining the geoposition of a body using a magnitude and direction of the difference in displacement may include the use of an optimization algorithm.

The method described herein may be automated by, for example, tangibly embodying a program of instructions upon a computer readable storage media capable of being read by machine capable of executing the instructions. A general purpose computer is one example of such a machine. A non-limiting exemplary list of appropriate storage media well known in the art would include such devices as a readable or writeable CD, flash memory chips (e.g., thumb drives), various magnetic storage media, and the like.

The features of the system and method have been disclosed, and further variations will be apparent to persons skilled in the art. All such variations are considered to be within the scope of the appended claims. Reference should be made to the appended claims, rather than the foregoing specification, as indicating the true scope of the disclosed method.

The functions and process steps disclosed herein may be performed automatically or wholly or partially in response to user command. An activity (including a step) performed automatically is performed in response to executable instruction or device operation without user direct initiation of the activity.

The systems and processes of FIGS. 1-4 are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. The processes and applications may, in alternative embodiments, be located on one or more (e.g., distributed) processing devices accessing a network linking the elements of FIGS. 1 and 2. Further, any of the functions and steps provided in FIGS. 3 and 4 may be implemented in hardware, software or a combination of both and may reside on one or more processing devices located at any location of a network linking the elements of FIGS. 1 and 2 or another linked network, including the Internet.

Thus, although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

The invention claimed is:

1. A method for determining geoposition, comprising:
    obtaining at least one image of the sky containing a plurality of stars, wherein respective distances between pairs of stars in the at least one obtained image vary as a function of geoposition, due to a dependence of the refraction of light from said plurality of stars on geoposition;
    compiling a list or table of the plurality of stars and their positions in the sky from the at least one obtained image, the positions of the plurality of stars in said list being uncorrected for atmospheric refraction;
    pattern-matching the list or table of said plurality of stars at said uncorrected positions with a predetermined list or table of stars to identify each of the plurality of stars;
    computing the respective distances between the uncorrected positions of pairs of stars in said plurality of stars from the at least one obtained image;
    predicting distances between the identified pairs of stars in said plurality of stars as a function of geoposition, based on at least one atmospheric refraction model;
    comparing, using a processor, the respective distances between said pairs of stars in said plurality of stars computed from the uncorrected positions, to the predicted distances of said pairs of stars in said plurality of stars; and
    determining using the processor, the geoposition of a body based on said comparing step.

2. The method of claim 1, wherein the step of obtaining the at least one obtained image of the sky comprises obtaining a single image using a wide-field-of-view camera.

3. The method of claim 1, wherein the step of obtaining the at least one image of the sky comprises obtaining multiple images of single stars using a pointed telescope.

4. The method of claim 3, wherein the step of obtaining the at least one image of the sky further comprises obtaining said multiple images at different points in time, and using a gyroscope to track movement of the telescope occurring at said different points in time.

5. The method of claim 1, wherein the step of determining the geoposition of a body comprises using an optimization algorithm to match the computed distances to the predicted distances derived from the atmospheric refraction model.

6. The method of claim 5, wherein the optimization algorithm determines a predicted star refraction pattern that best fits the computed distances between pairs of stars in the obtained image.

7. A system for determining geoposition, comprising:
    an image acquisition device for receiving light emitted from each of a plurality of stars in the sky;
    a processor in communication with the image acquisition device, the processor executing instructions for performing the following steps:
        compiling a list or table of said plurality of stars and their positions in the sky from said received light, said positions of said plurality of stars in said list being uncorrected for atmospheric refraction;
        pattern-matching the list or table of said plurality of stars at said uncorrected positions with a predetermined list or table of stars to identify each of the plurality of stars;
        computing respective distances between pairs of stars in said plurality of stars in at least one image obtained by the image acquisition device, based on said uncorrected positions, the respective distances varying as a function of geoposition due to a dependence of the refraction of the received light from the plurality of stars on geoposition;
        predicting distances between pairs of stars in said plurality of stars as a function of geoposition, based at least on one atmospheric refraction model;
        comparing the computed respective distances between said pairs of stars in said plurality of stars computed from the uncorrected positions, to the predicted distances of said pairs of stars in said plurality of stars derived from the at least one atmospheric refraction model; and
        determining the geoposition of a body based on said comparing step.

8. The system of claim 7, wherein said image acquisition device is a wide-field-of-view camera, said wide-field-of-view camera configured to obtain a single image of the sky.

9. The system of claim 7, wherein said image acquisition device is a pointed telescope, wherein said pointed telescope is configured to obtain multiple images, each image of said multiple images containing an image of one star.

10. The system of claim 7, wherein said image acquisition device is configured to obtain multiple images at different points in time, and wherein said system further comprises a gyroscope configured to track movement of the image acquisition device occurring at different points in time.

11. The system of claim 7, wherein said processor is further configured to execute instructions for performing an optimization algorithm configured to match a computed distance to said predicted distances derived from said atmospheric refraction model and determining a geoposition of a body based on a value computed by said optimization algorithm.

12. The system of claim 11, wherein said optimization algorithm is configured to determine a predicted refraction pattern that best fits the computed distance between pairs of stars in said plurality of stars.

* * * * *